United States Patent
Yogaratnam

(12)
(10) Patent No.: US 6,677,933 B1
(45) Date of Patent: Jan. 13, 2004

(54) METHOD AND APPARATUS FOR OPERATING A VIRTUAL KEYBOARD

(75) Inventor: Kumanan Yogaratnam, Ottawa (CA)

(73) Assignee: Espial Group Inc., Ottawa (CA)

( * ) Notice: Subject to any disclaimer, the term of this patent is extended or adjusted under 35 U.S.C. 154(b) by 0 days.

(21) Appl. No.: 09/440,174

(22) Filed: Nov. 15, 1999

(51) Int. Cl.$^7$ .................................. G09G 5/00
(52) U.S. Cl. ........................ 345/174; 345/773
(58) Field of Search .......................... 345/156, 157, 345/158, 168, 169, 173, 174, 762, 763, 764, 765, 766, 767, 773

(56) References Cited

U.S. PATENT DOCUMENTS 6,169,538 B1 * 1/2001 Nowlan et al. ............ 345/168
6,525,717 B1 * 2/2003 Tang ......................... 345/177

* cited by examiner

Primary Examiner—Vijay Shankar
(74) Attorney, Agent, or Firm—Shapiro Cohen; Dennis R. Haszko

(57) ABSTRACT

In a Java™ environment, a virtual keyboard is provided which is platform independent and which operates without modification to the Java™ applications with which it interacts. The virtual keyboard is integral to an embedded desktop which communicates between the Java™ Virtual Machine and any Java™ applications running on the system. The virtual keyboard comprises a simulated keyboard which is presented to a user on a touch screen and a virtual keyboard manager. The virtual keyboard manager acts as a focus listener for all components generated by the user interface of the applications running on the system. As a user engages components, focus events are tracked by the virtual keyboard manager, so that that the simulated keyboard will always reference the component selected by the user. The virtual keyboard manager also acts as a container listener, adding and removing containers (and their children) as applications are opened and closed or as the user interface of an application changes dynamically during use. The tracking of containers serves to facilitate garbage collection of Java™ objects.

19 Claims, 7 Drawing Sheets

METHOD AND APPARATUS FOR OPERATING A VIRTUAL KEYBOARD

BACKGROUND TO THE INVENTION

1. Field of Invention

The present invention relates to the field of internet information appliances and more particularly to a method and apparatus for running a platform independent virtual keyboard on such an appliance.

2. Description of the Related Prior Art

In a typical desktop computer configuration there exists a physical keyboard for inputting data to the various applications which are running. However, as computing devices have reduced in size, alternate means have been developed for inputting data. For example, multi-function cellular phones rely on the keypad to allow a user to input data. The entry of alpha characters is somewhat awkward as there are generally three letters associated with each key on the keypad, since the keypad is designed primarily for numeric entry. In order to streamline data input, virtual keyboards have been developed. A pictorial image of a keyboard appears on the screen of the information appliance in use, allowing input to the data fields associated with the underlying application. The display screen is generally touch sensitive, so that the user, using their finger or a wand can enter a desired character string. One of the problems with present day virtual keyboards is that they have been implemented at the system level using platform-dependent means e.g. 3Com's PalmPilot™ is a native-level feature that will only work under the PalmOS operating system running on the Motorolla Dragonball platform as shown in FIG. 1. There are several applications such as e-mail, address book and a date book which run on this platform and which can receive input from the virtual keyboard. However, if there were any new applications which a user desired to run, they would have to be written specifically with this configuration in mind. Otherwise, the virtual keyboard would be inoperative with respect to these applications. In operation, the virtual keyboard associates itself with the applications which are open through the operating system running on the information appliance. The inability for the virtual keyboard to function under any other operating system limits the universality of information appliance, making it ultimately undesirable.

In an attempt to move away from a dependency on a particular hardware and operating system configuration, the Java™ programming language was developed. Java™ allows applications to be run on any hardware platform without having to be rewritten or recompiled by the programmer for each separate platform. Further, Java™ can be used to create complete applications that may run on a single computer or be distributed among servers and clients in a network such as the Internet. The programs created using Java™ are portable in a network meaning that once the program is compiled into Java™ bytecode it can be run anywhere in a network on a server or client that has a Java™ interpreter or Java™ virtual machine (JVM). The JVM is an abstract computer (i.e. actually a software layer) that provides an interface between compiled Java™ binary code and the hardware platform which actually performs the programs instructions. Once a JVM has been provided for a platform, any Java™ program can run on the platform. Diagrammatically, this can be described as shown in FIG. 2.

Java™ is an object-oriented programming language which means, among other characteristics, that similar objects can take advantage of being part of the same class and inherit common code. An object is what is actually run in the computer. It contains programming code (sequences of computer instructions) and data (information which the instructions operate on). All communication to an object is done via messages which define the interface to the object i.e. the internal data and code of the object cannot be accessed directly. An object is defined by its class, with a class being a template definition of the methods and variables in a particular kind of object. Objects are individual instances of a class, containing real values instead of variables. Each object is made into a generic class of objects and even more generic classes are defined so that objects can share models and reuse the class definitions in their code. Variables are data types which are not assigned a constant value, while a method is the action or programmed procedure that a message carries out. A method is defined as part of a class and included in any object of that class.

In Java™ programming, there are application programs and compact programs called applets. An application program is a program designed to perform a specific function directly for the user or, in some cases, for another application program (e.g. word processors, Web browsers, etc.). Applications use the services of the computer's operating system and other supporting applications. On the other hand, an applet is a small program that can be sent along with a Web page to a user. Java™ applets can perform interactive animations, immediate calculations, or other simple tasks without having to send a user request back to the server. Web browsers that support Java™ are able to download the applet to the user's hardware and then execute it i.e. the executable software is downloaded when you need it and then discarded when the program has been executed.

Practically speaking, the major software manufactures have built a JVM into their operating systems and/or Web browsers to allow Java™ applications or applets to run e.g. a Windows™ machine will have a Java™ interpreter for the Windows/Intel/IBM environment, a Mac™ will have a Mac-Java interpreter, etc. An example of such software would be the web browser NETSCAPE™.

Presently, when a user desires to use multiple Java™ applications they must invoke separate Java™ interpreters. As shown in FIG. 3, in the traditional model each Java™ application has its own associated JVM which must be run (instantiated) as a system process to run the application with which it is associated. This is considered inefficient because the applications must share the same memory and other resources of the information appliance in which they are operating. Further, each application runs independent of the other, so that any virtual keyboard which is generated to allow data input to a particular Java™ application, can only be used with the associated Java™ application.

SUMMARY OF INVENTION STATEMENT

The present invention seeks to overcome the disadvantages of the prior art by providing an embedded desktop which can run multiple applications simultaneously under one instance of a JVM and which provides a virtual keyboard which, allows data input to any open Java™ application or component within an application without modifying the behavior of the application or component.

In accordance with one aspect of the present invention there is provided a computer implemented method of operating a platform independent virtual keyboard allowing input to a plurality of open Java™ applications running under one instance of a Java™ Virtual Machine comprising the steps of: launching an embedded desktop comprising a core and at least a service vendor plug-in and a user interface plug-in, wherein the embedded desktop communicates with the plurality of open Java™ applications and the Java™ Virtual Machine; generating input means for presentation on a touch sensitive display screen and presenting the user interface of the open Java™ applications to the touch sensitive display screen; invoking a virtual keyboard manager which communicates with the virtual keyboard and the embedded desktop; adding the virtual keyboard manager as a focus listener to all active components and as a container listener to all active containers; upon selection of a first component by a user, updating the virtual keyboard manager with a focus gained event; referencing the virtual keyboard to the selected first component; communicating a simulated key event to the referenced component for each key on the virtual keyboard selected by a user; upon selection of a second component by the user, updating the virtual keyboard manager with a focus lost event associated with the first component and updating the virtual keyboard manager with a focus gained event associated with the second component; referencing the virtual keyboard to the selected second component; upon the removal of a container or its children, updating said virtual keyboard manager; and upon the addition of a container or its children, updating said virtual keyboard manger.

In another aspect of the present invention there is provided in a computer comprising storage means, a central processing unit, an operating system, a Java™ Virtual Machine, an embedded desktop running a plurality of Java™ applications under one instance of a Java™ Virtual Machine, the embedded desktop stored in the storage means and comprising at least a core, a service vendor plug-in and a user interface plug-in, a virtual keyboard comprising: input means; and a virtual keyboard manager communicating with the input means; wherein the embedded desktop communicates with the plurality of Java™ applications and the Java™ Virtual Machine; and wherein the input means and the user interface of the Java™ applications is presented to a touch sensitive display screen when the embedded desktop and the plurality of Java™ applications are opened; and wherein the virtual keyboard manager is added as a focus listener to all active components and as a container listener to all active containers; and wherein the virtual keyboard manager is updated with a focus gained event upon selection of a first component by a user; and wherein the virtual keyboard is referenced to the selected first component; and wherein a simulated key event is communicated to the referenced component for each key on the virtual keyboard selected by a user; and wherein the virtual keyboard manager is updated with a focus lost event associated with the first component and the virtual keyboard manager is updated with a focus gained event associated with the second component; and wherein the virtual keyboard is referenced to the selected second component; and wherein said virtual keyboard manager is updated upon removal of a container or its children; and wherein said virtual keyboard manager is updated upon addition of a container or its children.

In yet another aspect of the present invention there is provided a computer-readable medium having stored thereon, computer-executable instructions which, when executed by a processor, cause the processor to perform the steps of: launching an embedded desktop comprising a core and at least a service vendor plug-in and a user interface plug-in, wherein the embedded desktop communicates with a plurality of open Java™ applications and a Java™ Virtual Machine; generating a virtual keyboard for presentation on a touch sensitive display screen and presenting the user interface of the open Java™ applications to the touch sensitive display screen; invoking a virtual keyboard manager which communicates with the virtual keyboard; adding the virtual keyboard manager as a focus listener to all active components and as a container listener to all active containers; upon selection of a first component by a user, updating the virtual keyboard manager with a focus gained event; referencing the virtual keyboard to the selected first component; communicating a simulated key event to the referenced component for each key on said virtual keyboard selected by a user; upon selection of a second component by the user, updating the virtual keyboard manager with a focus lost event associated with the first component and updating the virtual keyboard manager with a focus gained event associated with the second component; referencing the virtual keyboard to the selected second component; updating said virtual keyboard manager upon the removal of a container; and updating said virtual keyboard manager upon the addition of a container.

BRIEF DESCRIPTION OF THE DRAWINGS

A better understanding of the invention will be obtained by reading the description of the invention below, with reference to the following drawings, in which.

DESCRIPTION OF THE PREFERRED EMBODIMENT

Figure 1:
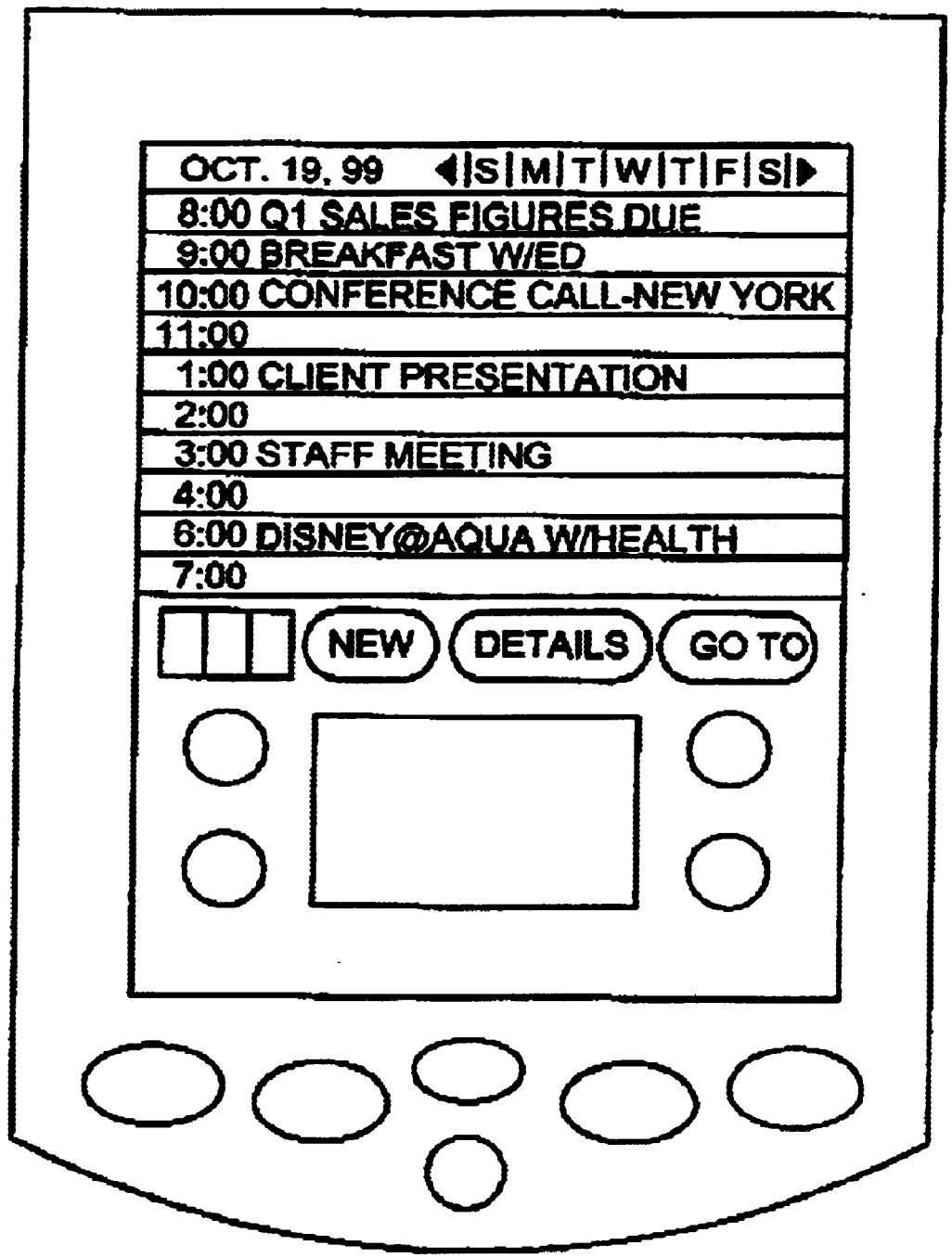
FIG. 1 is a pictorial representation of an information appliance in accordance with the prior art.
Figure 2:
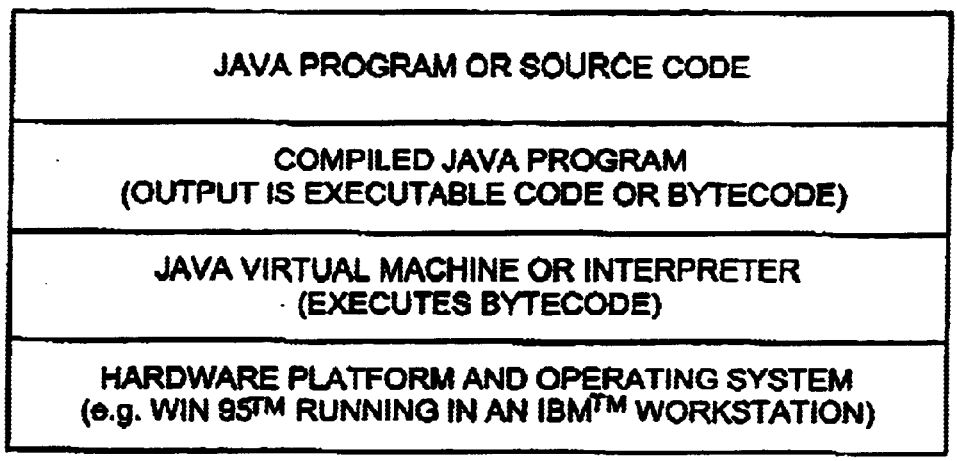
FIG. 2 is a model of a traditional stack associated with the Java™ based platform.
Figure 3:
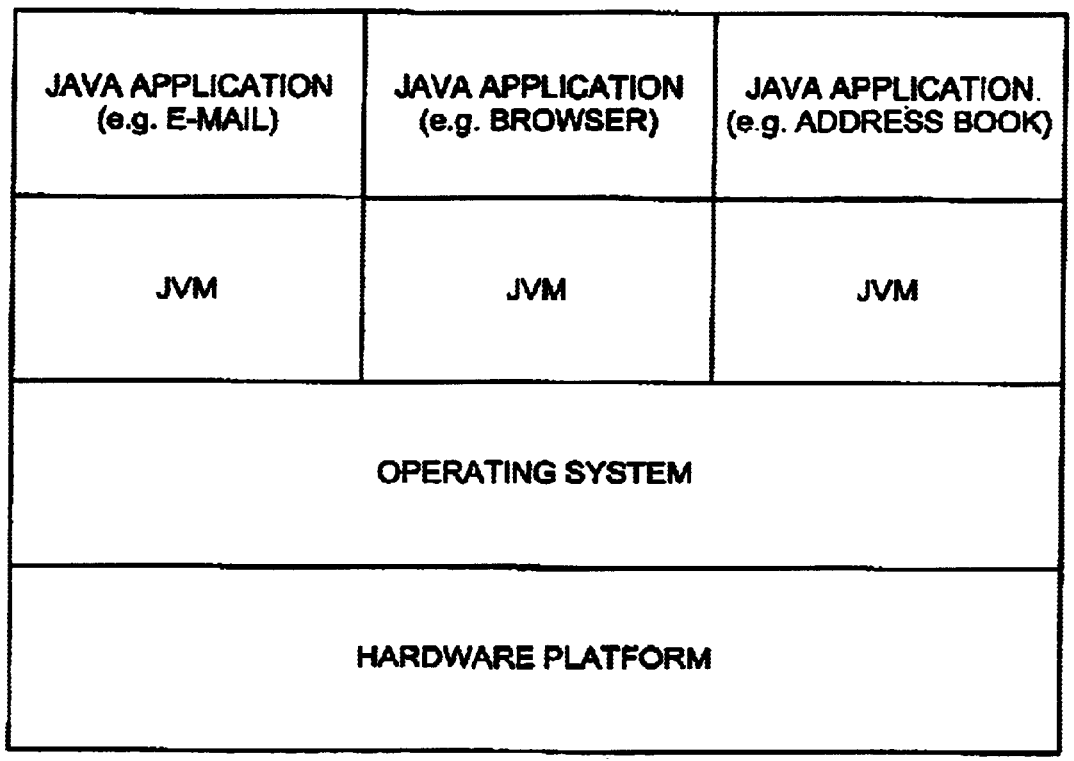
FIG. 3 is a model of a traditional stack in a multi-Java™ application environment.
Figure 4:
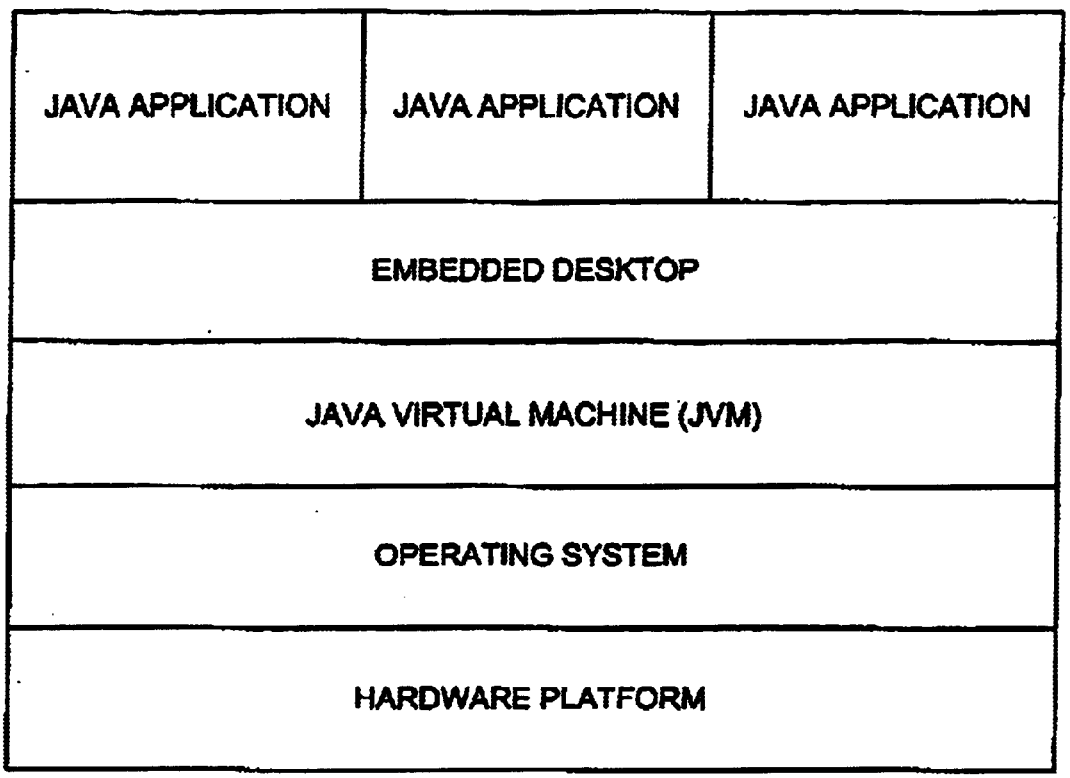
FIG. 4 is a model of the stack incorporating an embedded desktop.

FIGS. 4 depicts the relationship of the hardware platform, operating system, embedded desktop with its integral virtual keyboard, JVM and Java™ applications in accordance with the present invention. Through the introduction of the embedded desktop, only one instance of a JVM is required to be run, regardless of the number of Java™ applications which have been launched. The embedded desktop with its integral virtual keyboard can be implemented on any information appliance which is configured as described in FIG. 4. Such information appliances include, but are not limited to, workstations, cellular phones, and personal digital assistants such as Apple's Newton™.

As will be appreciated by those skilled in the art, the expression "hardware platform" used in the drawings is a generic term used to describe the main physical components of an information appliance. In general, such information appliances comprise a bus for communicating instructions, a processor coupled to the bus for processing the instructions, random access memory coupled with the bus for storing volatile information and instructions for the processor, read only memory coupled to the bus for storing static information and instructions for the processor, a display device (shown as 16 in FIG. 5) coupled with the bus for displaying information to a user, an alphanumeric input device coupled with the bus for communicating information and command selections to the processor, and a mass storage device (shown as 18 in FIG. 5) for storing information and instructions. The processor may be any of a wide variety of general purpose processors or microprocessors such as the SPARC™ manufactured by Sun MicroSystems or the PENTIUM™ manufactured by Intel Corporation. In order to accommodate the virtual keyboard, the display device should be a touch screen, such as a liquid crystal display touch screen, while the mass storage device includes, but is not limited to, a hard disk, floppy disk, optical storage device or the like.

The preferred embodiment of the present invention is implemented as a software module which may be executed in a conventional manner on an information appliance as described above. The embedded desktop with its integral virtual keyboard is stored in read only memory and subsequently loaded into and executed by the processor integral to the information appliance. Once initiated, the software of the preferred embodiment operates in the manner which will be described below.

Figure 5:
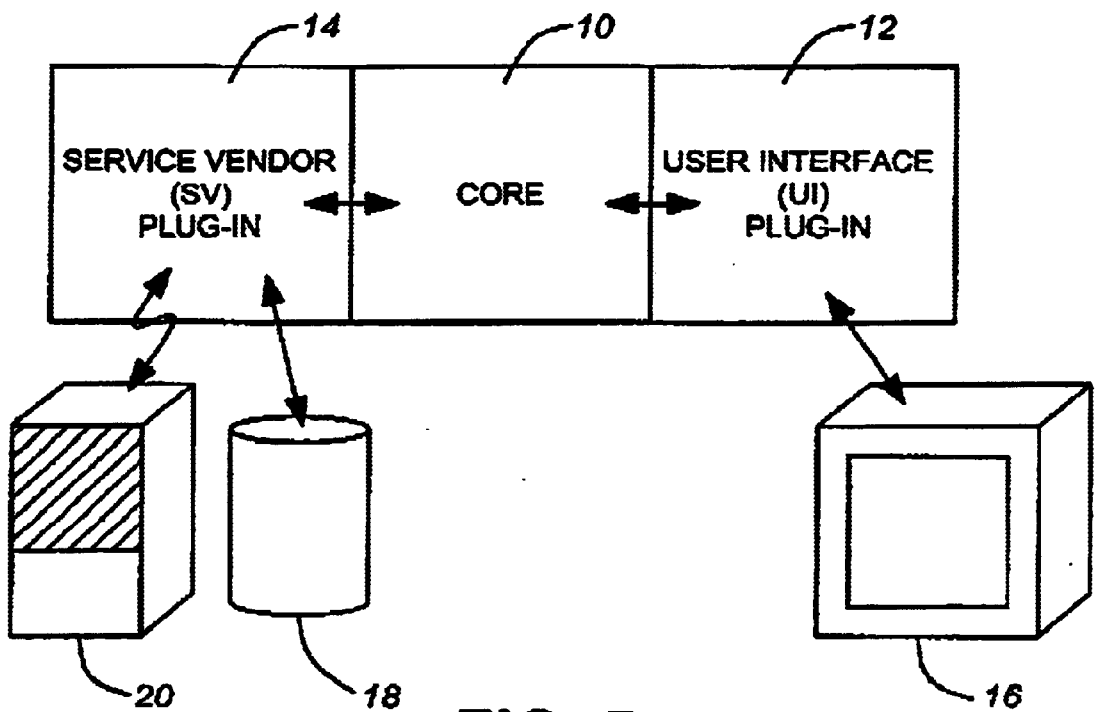
FIG. 5 is a diagrammatic overview of an embedded desktop.

FIG. 5 is a diagrammatic overview of the embedded desktop in accordance with the present invention. An embedded desktop serves to manage all aspects of the operating environment and incorporates such user aids as an application launcher, input device manager and a remote application deployment manager (RADM). An application launcher manages applications and provides users with a method to access applications and document shortcuts. An input device manager allows users to select the input device of their choice. Finally, the RADM allows users to download or receive subscription software and install it as well as providing device manufacturers and content developers the ability to upgrade their device software transparently and remotely. In general, the embedded desktop comprises a kernel or Core 10 with hooks to a variety of plug-ins such user interface (UI) plug-in 12 and a service vendor (SV) plug-in 14. The embedded desktop has a relatively small footprint of approximately 50 Kilobytes. Despite the small footprint, the embedded desktop provides the full functionality normally associated with much larger (10 Mbyte) desktop managers.

Figure 6:
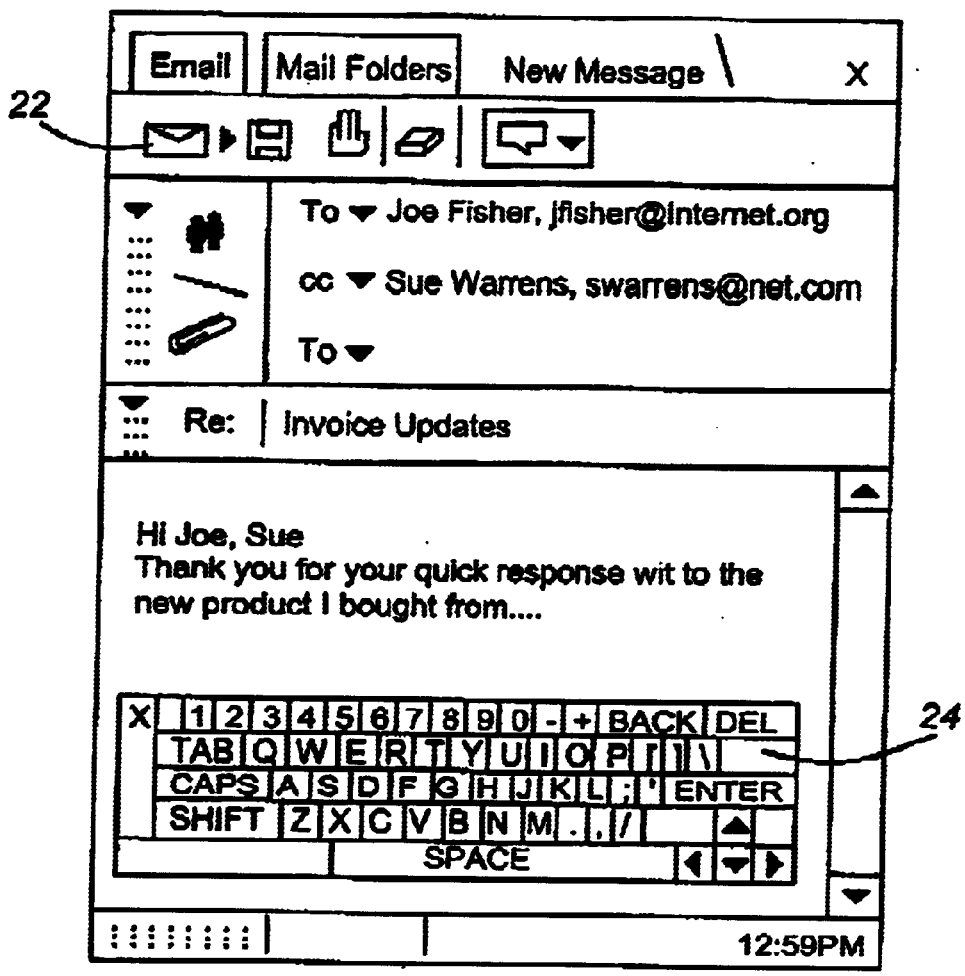
FIG. 6 is a pictorial representation of a graphical user interface (GUI) incorporating a virtual keyboard.

The present invention focuses on the UI plug-in 12 and a virtual keyboard which is integral to it. The UI plug-in 12 is configured to communicate with a display device 16 while the Service Vendor (SV) plug-in 14 is configured to communicate with a local mass storage device 18 or remote network server or device 20 which stores Java™ applications to be loaded. UI plug-in 12, also known as the "look-and-feel" plug-in, allows the user to integrate their own graphical user interface (GUI) or adopt the standard GUI provided with the embedded desktop. As shown in FIG. 6, a GUI can include a variety of icons 22 and a pictorial depiction of a virtual keyboard 24 which facilitates input to the user interface of the application presently being presented the user.

Figure 7:
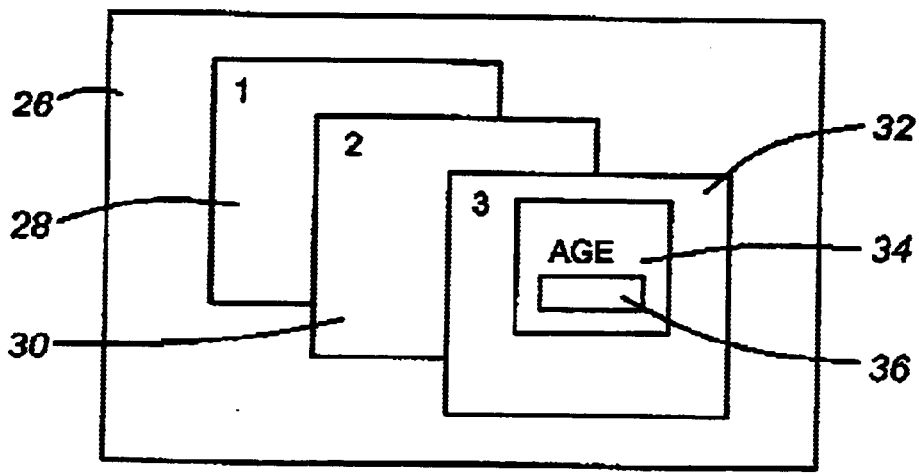
FIG. 7 is a diagram depicting the relationship of containers and components.

FIG. 7 describes the relationship of containers and components in the Java™ Abstract Windowing Toolkit (AWT). In object-oriented language a container is a class that organizes other objects. A container represents the parent object in a visual component hierarchy. It is a visual element that contains sub-elements or children and delegates some of its functionality to these children. On the other hand, a component cannot have children but can be the child of a container. Generically, containers that have children are referred to as parent containers. In practical terms, a component is the data field or icon with which the user must interact e.g. a button or data entry box. In the present invention, there is a global root container 26 which is established when the embedded desktop is launched. Each Java™ application which is opened establishes an application root container (shown as 28, 30 and 32) as a child of the global root container 26. Each application root container may also have children in the form of other containers (one of which is shown as 34) or components (one of which is shown as 36).

Figure 8:
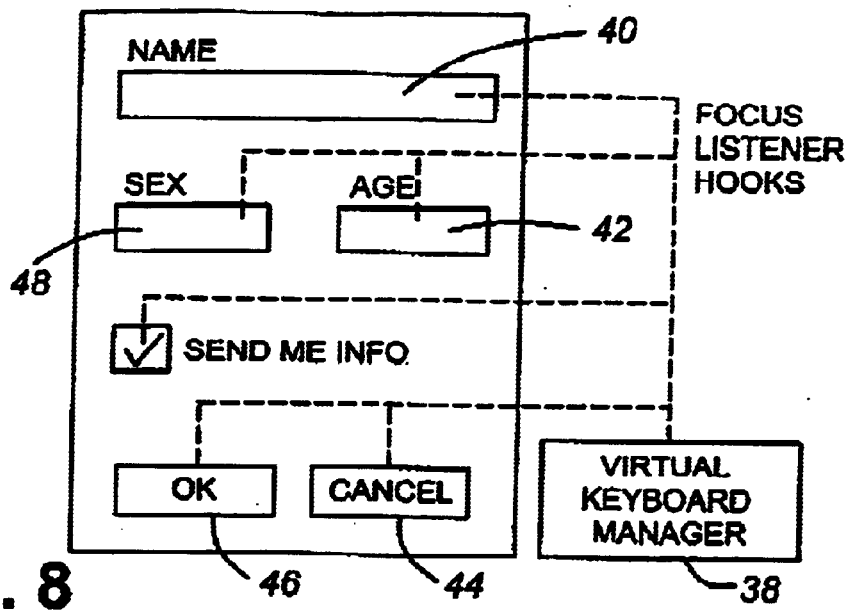
FIG. 8 is a diagram highlighting the relationship of the virtual keyboard manager to components in an application.

As is well known in the art, integral to the Java™ specification is the concept of a Focus Manager which is the object that maintains the reference to the component having focus and knows how to move the focus forward or backward. Components can gain or lose focus and when they have focus they are designated the focus owner. Further, only a component which is the focus owner can receive input from a keyboard. This rule is true in all systems whether or not a virtual keyboard 24 is in use. Other entities can monitor or act as a focus listener. Referring to FIG. 8, in the present invention, a virtual keyboard manager 38 is established as a focus listener. The virtual keyboard manager 38 attaches or hooks itself to all active components (shown as 40, 42, 44, 46 and 48) in the user interface of the application or applications being presented.

Figure 9:
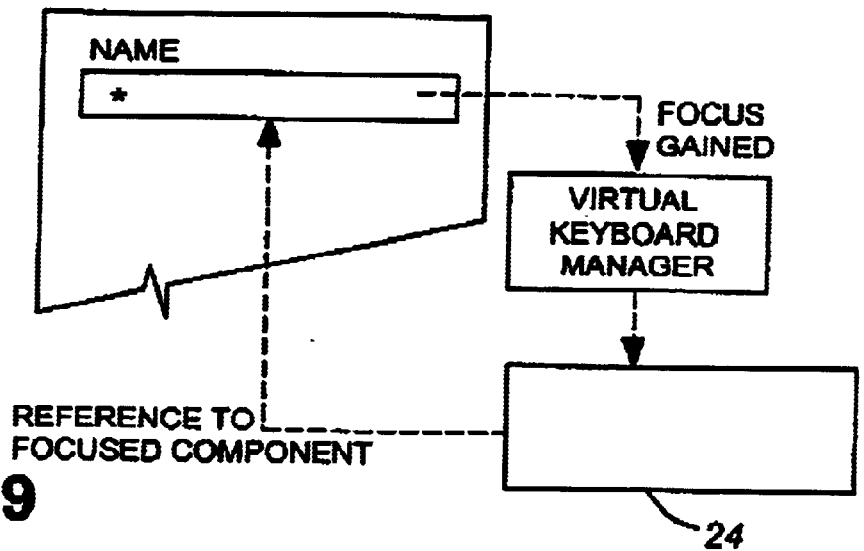
FIG. 9 is a diagram highlighting the relationship of the virtual keyboard manager, the virtual keyboard and a first component.
Figure 10:
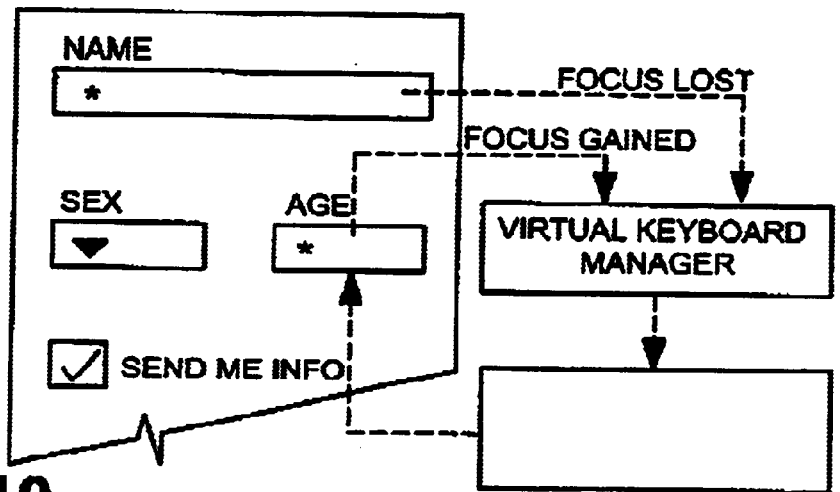
FIG. 10 is a diagram highlighting the relationship of the virtual keyboard manager, the virtual keyboard and a first and second component.

In general, there are only two kinds of focus events: a focus gained event; and a focus lost event. When a component gains or loses focus, an event is sent to all focus listeners. As shown in FIG. 9, if a user places their cursor in a component such as the data entry field labeled "Name" (shown as 40), a focus gained event is sent to all focus listeners including the virtual keyboard manager 38. It is the virtual keyboard manager's role to know at any given time if a component has focus and if so, which component has focus. As shown in FIG. 10, the virtual keyboard 24 communicates with the virtual keyboard manager 38. When a key is touched on the virtual keyboard 24, the virtual keyboard 24 asks the virtual keyboard manager 38 for the reference to the currently focused component and posts a key input event to that component which is the focus owner. In the example shown in FIG. 10, the entry is made in component 40. In the event that no component has focus, the key input event would have no effect. Also referring to FIG. 10, if the user now places their cursor in the data entry field labeled "Age" (shown as 42), a focus lost message would be sent from component 40 to all focus listeners, and the virtual keyboard manager 38 would register that there is no component now in focus. When a focus gained event is subsequently sent from component 42 to the virtual keyboard manager 38, the virtual keyboard manager 38 would then register that component 42 is now the focus owner. Generally speaking, when a component gains focus any other component currently in focus loses focus. As described in relation to component 40, once component 42 has gained focus, if a key is touched on virtual keyboard 24, then the virtual keyboard 24 asks the virtual keyboard manager 38 for the reference to the currently focused component and posts a key input event to component 42. Through the aforementioned process, the virtual keyboard manager 38 always knows who does and who does not have input focus, and thus who should receive keyboard input events from the virtual keyboard 24.

Figure 11:
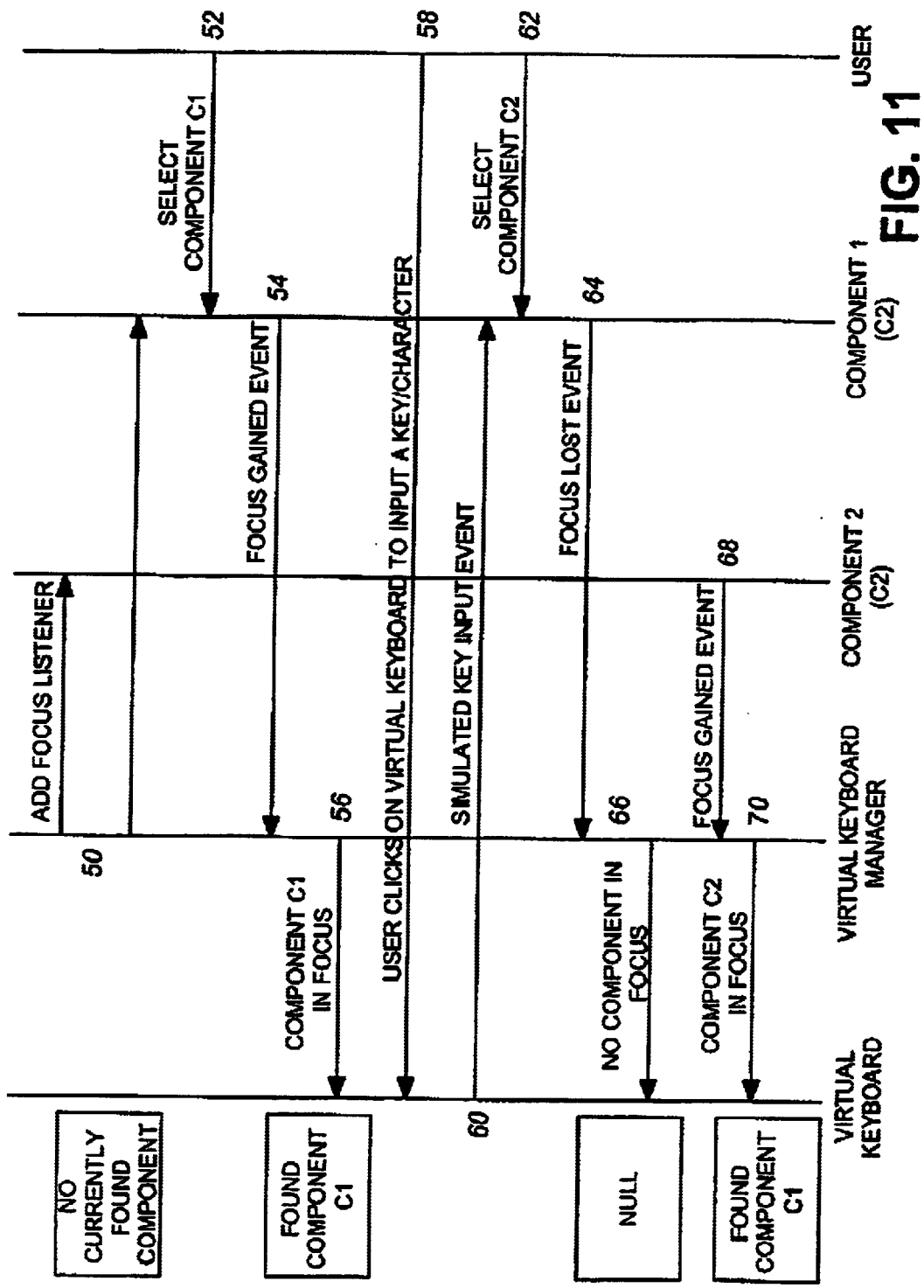
FIG. 11 is a message flow chart defining the sequence of steps in the data input process.

FIG. 11 is a message flow chart defining the sequence of steps in the data input process. At step 50 the virtual keyboard manager 38 adds focus listener hooks to both component 1 and component 2 when, for example, an application containing these two components is launched. At step 52 a user selects component 1. At step 54 a focus gained event is sent from component 1 to the virtual keyboard manager 38 and, at step 56, component 1 is registered as being in focus. When a user hits a key on the virtual keyboard 24, at step 58 the virtual keyboard 24 asks the virtual keyboard manager 38 for the reference to the currently focused component and posts, at step 60, a simulated key input event to component 1. This process continues until all of the entries in relation to component 1 are complete. If, at step 62, a user then selects component 2, at step 64 a focus lost event is sent to the virtual keyboard manager and, at step 66, the virtual keyboard manager 38 is deemed to have no focus. At step 68 component 2 sends a focus gained event and, at step 70, component 2 is registered as being in focus. Steps 62 to 70 are repeated for each new component which is selected by the user i.e. a focus lost event is sent from the previous component and a focus gained event is sent from the selected component. If a new application is launched step 50 is repeated i.e. focus listener hooks are added to the new component. Once a new component is in focus steps 58 to 60 are repeated for each key selected by the user.

The present invention also incorporates the concept of a container listener, a further function of the virtual keyboard manager 38. In addition to establishing hooks to all components, hooks to all containers are also established by the virtual keyboard manager 38. As containers are added and removed, the container listener is updated. For example if an application is closed, the associated application root container would notify the container listener. Alternately, if a new application is launched, the associated application root container would notify the container listener. When a container is closed, all of the children associated with that container are also closed. Child containers would update the container listener and child components would update the focus listener of the virtual keyboard manager 38. Additionally, when children of a parent container are closed without the parent container being closed, the parent container is notified and the container listener and focus listener updated as required. For example, this situation would arise where the user interface of an application dynamic changed, due to a user interacting with a particular component of the application.

Figure 12:
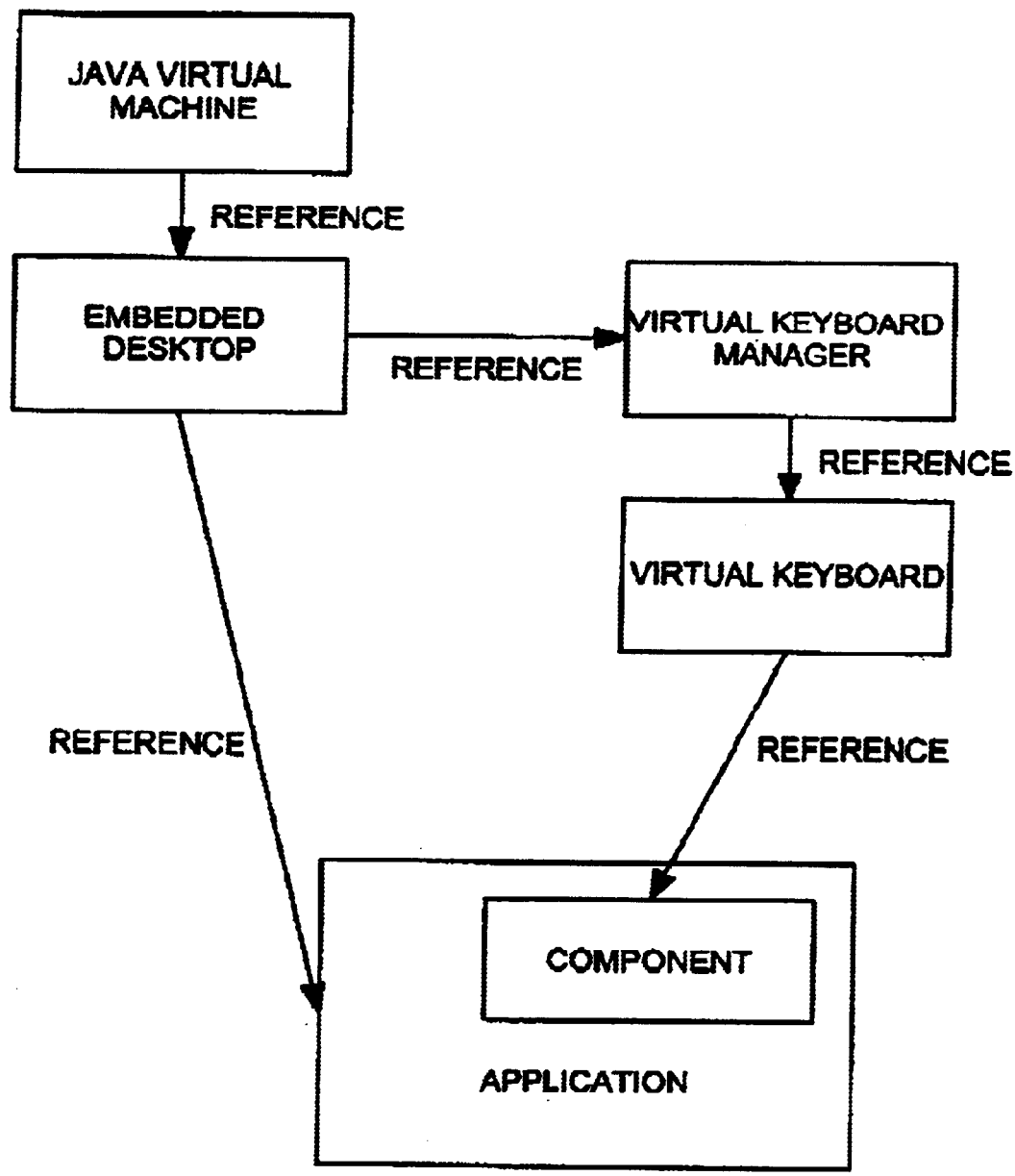
FIG. 12 is a model of the referencing which occurs within the Java™ environment.

The incorporation of a container listener facilitates garbage collection in Java™. As will be understood by those skilled in the art, in Java™ memory is allocated only to objects. There is no explicit allocation of memory, there is only the creation of new objects. Java™ employs a garbage collector that reclaims the memory occupied by an object once it is determined that an object is no longer accessible. Objects are referenced when they are in use e.g. when the embedded desktop is launched, the JVM references the embedded desktop, to highlight the fact that it is an object in use and cannot be garbage collected. Similarly, if an application is launched, the embedded desktop would reference the application. In the embedded desktop, when the virtual keyboard manger 38 is launched, it is referenced by the embedded desktop and the virtual keyboard 24 is in turn referenced by the virtual keyboard manger 38. As discussed earlier, the virtual keyboard references a component when the component is in focus. FIG. 12 diagrammatically depicts the referencing relationship between the aforementioned elements. In the event that an application is closed and the embedded desktop reference removed, garbage collection may not be allowed if a component is in focus and thereby referenced by the virtual keyboard 24. By maintaining a container listener, if an application is closed, the associated application root container would be removed and the reference to all children (including components) would be severed. Garbage collection of the application object would then be allowed because all of the references to that application would be terminated.

The advantages of the present invention are now readily apparent:

(a) a virtual keyboard is provided that is platform independent and which can run on top of any JVM;

(b) no modification of the Java™ applications being affected by the virtual keyboard is required as long as the application is AWT compatible;

(c) the virtual keyboard works with any Java™ application(s) running on top of the embedded desktop; and (d) the manner in which the virtual keyboard operates facilitates garbage collection.

It will be understood by those skilled in the art that the virtual keyboard which has been described can operate in conjunction with a singular Java™ application running on top of a Java™ virtual machine. This would represent the most simple use of the present invention. The preferred embodiment of the invention as detailed above, describes a more complicated configuration with an embedded desktop running multiple applications on top of a Java™ virtual machine.

A person skilled in the art may now conceive of alternate structures and embodiments or variations of the above. All those which fall within the scope of the claims appended hereto are considered to be part of the present invention.

The embodiments of the invention in which an exclusive property or privilege is claimed are defined as follows:

1. A computer implemented method of operating a platform independent virtual keyboard allowing input to a plurality of open Java™ applications running under one instance of a Java™ Virtual Machine comprising the steps of:

(a) launching an embedded desktop comprising a core, and at least a service vendor plug-in and a user interface plug-in, wherein said embedded desktop communicates with said plurality of open Java™ applications and said Java™ Virtual Machine;

(b) generating input means for presentation on a touch sensitive display screen and presenting the user interface of said open Java™ applications to said touch sensitive display screen;

(c) invoking a virtual keyboard manager which communicates with said virtual keyboard and said embedded desktop;

(d) adding said virtual keyboard manager as a focus listener to all active components and a container listener to all active containers;

(e) upon selection of a first component by a user, updating said virtual keyboard manager with a focus gained event;

(f) referencing said virtual keyboard to said selected first component;

(g) communicating a simulated key event to said referenced component for each key on said virtual keyboard selected by a user;

(h) upon selection of a second component by said user, updating said virtual keyboard manager with a focus lost event associated with said first component and updating said virtual keyboard manager with a focus gained event associated with said second component;

(i) referencing said virtual keyboard to said selected second component;

(j) upon the removal of a container or its children, updating said virtual keyboard manager; and (k) upon the addition of a container or its children, updating said virtual keyboard manager.

2. A computer implemented method of operating a platform independent virtual keyboard allowing input to an open Java™ application running on top of a Java™ Virtual Machine comprising the steps of:

(a) generating input means for presentation on a touch sensitive display screen and presenting the user interface of said open Java™ application to said touch sensitive display screen;

(b) invoking a virtual keyboard manager which communicates with said virtual keyboard and said open Java™ application;

(c) adding said virtual keyboard manager as a focus listener to all active components, and a container listener to all active containers;

(d) upon selection of a first component by a user, updating said virtual keyboard manager with a focus gained event;

(e) referencing said virtual keyboard to said selected first component;

(f) communicating a simulated key event to said referenced component for each key on said virtual keyboard selected by a user;

(g) upon selection of a second component by said user, updating said virtual keyboard manager with a focus lost event associated with said first component and updating said virtual keyboard manager with a focus gained event associated with said second component;

(h) referencing said virtual keyboard to said selected second component;

(i) upon removal of a container or its children, updating said virtual keyboard manager; and (j) upon addition of a container or its children, updating said virtual keyboard manager.

3. The method of claim 1 wherein a global root user interface container is generated when said embedded desktop is launched.

4. The method of claim 3 wherein an application root container is generated when each of said applications are opened, and wherein said application root container is a child to said global root user interface container.

5. The virtual keyboard of claim 1 wherein said input means is an opaque character display superimposed on the user interface of said respective open Java™ applications.

6. The virtual keyboard of claim 1 wherein said input means is a semi-transparent character display superimposed on the user interface of said respective open Java™ applications.

7. The method of claim 1 wherein said virtual keyboard manager is stored in read only memory.

8. The method of claim 1 wherein said plurality of open applications are stored locally in an optical storage device or remotely at a server in a network.

9. In a computer comprising storage means, a central processing unit, an operating system, a Java™ Virtual Machine, an embedded desktop running a plurality of Java™ applications under one instance of a Java™ Virtual Machine, said embedded desktop stored in said storage means and comprising at least a core, a service vendor plug-in and a user interface plug-in, a virtual keyboard comprising:

(a) input means; and (b) a virtual keyboard manager communicating with said input means and said embedded desktop;

wherein said embedded desktop communicates with said plurality of Java™ applications and said Java™ Virtual Machine;

and wherein said input means and the user interface of said Java™ applications are presented to a touch sensitive display screen when said embedded desktop and said plurality of Java™ applications are opened;

and wherein said virtual keyboard manager is added as a focus listener for all active components, and a container listener for all active containers;

and wherein said virtual keyboard manager is updated with a focus gained event upon selection of a first component by a user;

and wherein said virtual keyboard is referenced to said selected first component;

and wherein a simulated key event is communicated to said referenced component for each key on said virtual keyboard selected by a user;

and wherein said virtual keyboard manager is updated with a focus lost event associated with said first component and said virtual keyboard manager is updated with a focus gained event associated with said second component;

and wherein said virtual keyboard is referenced to said selected second component;

and wherein said virtual keyboard manager is updated upon the removal of a container or its children;

and wherein said virtual keyboard manager is updated upon the addition of a container or its children.

10. In a computer comprising storage means, a central processing unit, an operating system, a Java™ Virtual Machine, and a Java™ application running on top of said Java™ Virtual Machine, a virtual keyboard comprising:

(c) input means; and (d) a virtual keyboard manager communicating with said input means and said Java application;

and wherein said input means and the user interface of said Java™ applications are presented to a touch sensitive display screen when said Java™ application is opened;

and wherein said virtual keyboard manager is added as a focus listener for all active components, and a container listener for all active containers;

and wherein said virtual keyboard manager is updated with a focus gained event upon selection of a first component by a user;

and wherein said virtual keyboard is referenced to said selected first component;

and wherein a simulated key event is communicated to said referenced component for each key on said virtual keyboard selected by a user;

and wherein said virtual keyboard manager is updated with a focus lost event associated with said first component and said virtual keyboard manager is updated with a focus gained event associated with said second component;

and wherein said virtual keyboard is referenced to said selected second component;

and wherein said virtual keyboard manager is updated upon the removal of a container or its children;

and wherein said virtual keyboard manager is updated upon the addition of a container or its children.

11. The virtual keyboard of claim 9 wherein said input means is an opaque character display superimposed on the user interface of said respective open Java™ applications.

12. The virtual keyboard of claim 9 wherein said input means is a semi-transparent character display superimposed on the user interface of said respective open Java™ applications.

13. The virtual keyboard of claim 9 wherein said storage means includes read only memory and said virtual keyboard manager is stored in said read only memory.

14. The virtual keyboard of claim 9 wherein said storage means includes an optical storage device and said plurality of applications are resident locally in said optical storage device or remotely at a server in a network.

15. A computer-readable medium having stored thereon, computer-executable instructions which, when executed by a processor, cause the processor to perform the steps of:

(a) launching an embedded desktop comprising a core and at least a service vendor plug-in and a user interface plug-in, wherein said embedded desktop communicates with a plurality of open Java™ applications and a Java™ Virtual Machine;

(b) generating a virtual keyboard for presentation on a touch sensitive display screen and presenting the user interface of said open Java™ applications to said touch sensitive display screen;

(c) invoking a virtual keyboard manager which communicates with said virtual keyboard;

(d) adding said virtual keyboard manager as a focus listener to all active components and as a container listener to all active containers;

(e) upon selection of a first component by a user, updating said virtual keyboard manager with a focus gained event;

(f) referencing said virtual keyboard to said selected first component;

(g) communicating a simulated key event to said referenced component for each key on said virtual keyboard selected by a user;

(h) upon selection of a second component by said user, updating said virtual keyboard manager with a focus lost event associated with said first component and updating said virtual keyboard manager with a focus gained event associated with said second component;

(i) referencing said virtual keyboard to said selected second component;

(j) updating said virtual keyboard manager upon the removal of a container; and (k) updating said virtual keyboard manager upon the addition of a container.

16. The computer-readable medium of claim 15 wherein a global root user interface container is generated when said embedded desktop is launched.

17. The computer-readable medium of claim 16 wherein an application root container is generated when each of said application is opened, and wherein said application root container is a child to said global root user interface container.

18. The computer-readable medium of claim 15 wherein said computer-readable medium is a read only memory.

19. The computer-readable medium of claim 15 wherein said plurality of open applications are stored locally in an optical storage device or remotely at a server in a network.

* * * * *